United States Patent [19]

Netterstedt et al.

[11] 3,715,557
[45] Feb. 6, 1973

[54] METHOD OF, AND APPARATUS FOR SPIRALLY WINDING STRIP METAL ABOUT A PIPE, AND SECURING ADJACENT STRIPS BY WELDING

[75] Inventors: Sture Netterstedt; Bengt Lindstrand, both of Fagersta, Sweden

[73] Assignee: Rostfria Tak AB, Fagersta, Sweden

[22] Filed: May 11, 1971

[21] Appl. No.: 142,327

[52] U.S. Cl. .................................................. 219/62
[51] Int. Cl. ............................................... B23k 1/16
[58] Field of Search......219/62, 59, 64, 67, 102, 158, 219/9

[56] References Cited

UNITED STATES PATENTS

| | | | |
|---|---|---|---|
| 3,106,177 | 10/1963 | Nicolaisen | 219/62 X |
| 1,502,052 | 7/1924 | Naylor | 219/62 X |
| 2,233,233 | 2/1941 | Williams | 219/62 |
| 2,992,319 | 7/1961 | Stanton et al | 219/62 X |
| 3,287,536 | 11/1966 | Fay | 219/62 |

*Primary Examiner*—J. V. Truhe
*Assistant Examiner*—L. A. Schutzman
*Attorney*—Herbert H. Goodman

[57] ABSTRACT

An annular carrier cage is placed around the pipe, which may be insulated. The carrier cage supports a holder for stainless steel strip, a flange forming apparatus, a flange extension apparatus, seam welding apparatus and a post-welding, flange stress relieving apparatus. To permit curling of the flanged strip about the circumference of the pipe, the flange extension apparatus reduces the diameter of the formed flange adjacent the edge thereof, for example by exerting pressure against the flange strip by a pair of conical rollers having their greater diameter adjacent the free edge of the flange. Adjacent flanges are welded together by roller electrodes, and a pair of conical rollers similar to the flange extension apparatus then bear against the welded joints to relieve stresses due to welding and provide for a tight wrap of the spiral, welded strip about the pipe.

21 Claims, 16 Drawing Figures

METHOD OF, AND APPARATUS FOR SPIRALLY WINDING STRIP METAL ABOUT A PIPE, AND SECURING ADJACENT STRIPS BY WELDING

Cross reference to prior patent: U.S. Pat. No. 3,264,446.

The present invention relates to apparatus and a method to cover pipes, and particularly insulated pipes, with a spirally wound metal covering strip, and more particularly to such an apparatus and method which automatically applies the spirally wound metal strip and joins adjacent edges of the metal strip together, by welding, as the strip is being unwound.

Large-diameter pipes or conduits, for example of from 0.1 to 1 meter, and more in diameter, are frequently used in many industries. Pipes of this kind are often desirably insulated, that is, covered with known insulating material which further increases the diameter of the pipe, for example in the order of fractions of a meter to a meter or more. Insulated pipe, or conduit of this type should, for mechanical, electrical and corrosion resistance frequently be covered by metal, and a particularly suitable wrapping is stainless steel. Covering a conduit, and particularly insulated conduit, with stainless steel strip provides excellent protection against external damage. Stainless steel has a high yield point which is even more increased when cold worked. Stainless steel has much higher strength than previously used aluminum, and, for equal thickness, is able to accept a mechanical load five times, or more as that of aluminum. Stainless steel additionally permits joining adjacent spiral wraps together by welding. Thus, an absolutely tight covering is obtained, which is completely water-tight and electrically continuous. Stainless steel provides an effective and complete barrier against penetration of moisture, or any substances inside of the covering, and also effectively prevents escape of fluids, gases, or the like from the conduit, for example, towards the outside. The outer housing additionally prevents contents flowing through the pipe, and which may have leaked slightly, from escaping to the environment or the surroundings of the conduit. A tight, welded continuous sheath can be used together with a leakage warning system, connected electrically between the inner conduit and the outer housing. Such leakage warning systems are known and may, for example, constitute electrical equipment which measures, by electrical pulses, changes in resistance between the inner conduit and the outer sheath and which can sense at which point, along the conduit, the leakage is situated. The capability of stainless steel to be welded prevents deterioration of the electrical contact between adjacent spirals, and thus change of the overall resistance of the welded sheath due to age.

Insulated pipes are subject to difficulties in connection with condensation occurring on the inside of the covering of insulated conduits. Such condensation may cause corrosion, frequently severely attacking covering metal sheets. If a completely seam-welded covering is applied, such condensation can be inhibited by including first a drying or hygroscopic compound in the covering and only then welding the sheet tight, so that the inner insulation is completely dry and no moisture can condense on the inside of the welded covering, after its installation. If necessary, steps can be taken to re-activate drying material. A stainless seam welded spiral covering provides an effective barrier against moisture from the outside, penetrating to the inside of the conduit and contaminating the moisture barrier. The life of the insulation is thus substantially extended, and cheaper insulation material can be used than one which is highly moisture-resistant.

The construction, in accordance with the present invention, provides a stainless steel covering in which adjacent spiral strips are welded along flanges made on the stainless steel strip as it is being unwound around the pipe. This construction permits slight expansion and contraction of the outside covering with respect to the conduit, and its insulation, both during placing of the weld, as well as when the covering has been installed. The stainless steel plate is non-combustible and will effectively suppress fire, and exclude oxygen from the outside through the cover and towards the inside so that combustible liquids carried by the pipe or conduit will be precluded from feeding on the oxygen in the air. The arrangement is such that the spirally wound stainless steel strip will, itself, hold the insulation around the conduit or pipe and little preparatory work is necessary to secure the insulation to the pipe proper. The stainless steel plate, being mechanically strong, is a complete barrier against the intrusion of plants, roots, or animals from the outside towards the insulation, which may cause damage. The stainless steel covering is, generally, pleasing in appearance and even above-ground installation will not present an unsightly appearance.

The stainless steel covering is completely inert with respect to the environment. Besides being absolutely tight, it will not react with surrounding earth, air, or water and thus not cause contamination, or permit contamination from the material of the insulation (which may include tars) or the material carried by the conduit.

The use of stainless steel thus permits substantial advantages with respect to known aluminum, or non-metallic coverings; aluminum plates, or pipe sections mounted around insulations are difficult to secure, usually being interconnected by riveting or the like; aluminum will, however, react with the surrounding environment and eventually corrode. Spirally wound aluminum cannot be readily welded and leakages will develop between seams, further causing changes in electrical resistance along the length of the aluminum covering so that automatic measuring and remote control sensing apparatus is difficult to adjust and to keep in balance. Covering with non-metallic substances, such as impregnated fabrics or tapes, even when combined with aluminum, have not completely solved the problem, particularly due to the poor mechanical strength of such coverings which eventually permit exposure of the aluminum to surrounding moisture, and thus will not provide a long-term barrier against the intrusion of plants, animals, insects and the like from the outside to the insulation.

The method, and apparatus of the present invention can be adapted to the installation of conduits or pipes either in a trench, above ground, or under water, and can be applied as the pipe itself is being laid.

It is an object of the present invention to provide a method of covering insulated pipe or conduit with a sheath of stainless steel, welded together to adjacent spirals, to form one integral, unitary whole, covering the insulated conduit.

*Subject matter of the present invention:* Briefly, the method and apparatus of the present invention provides for uncoiling a strip of metal from a roll, which is carried on a carrier cage; a flange is formed at the lateral edges of the metal strip as it is being unwound, and the flange is then worked to reduce the thickness thereof adjacent the free edges to permit curling of the flange about its edge, and thus wrapping of the flanged strip about the pipe. This is done in a flange forming apparatus which, for example, may include a pair of spring-loaded slightly conical rollers, bearing against the flange. The flange is guided to be adjacent the flange of a previously laid turn, and then seam-welded by an automatic seam-welding apparatus to the adjacent flange. After seam-welding, the flanges are preferably again cold-worked to relieve stresses which arose due to the welding and to provide for a tight wrap of the strip about the conduit.

Various types of welding apparatus can be used; one type, which has been found particularly applicable is disclosed and claimed in U.S. Pat. No. 3,264,446, Aug. 2, 1966, the disclosure of which is hereby incorporated by reference.

The invention will be described by way of example with reference to the accompanying drawings, wherein.

Figures 4, 5:
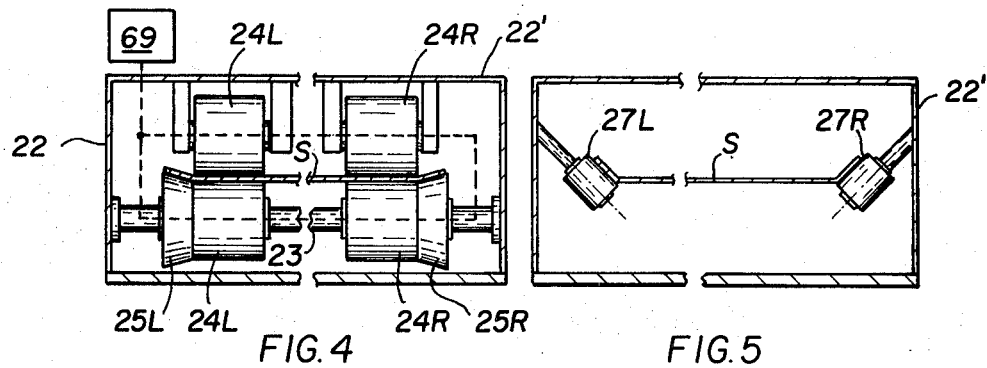
FIG. 4 is a cross-sectional view along lines IV—IV of FIG. 3.
FIG. 5 is a cross-sectional view along lines V—V of FIG. 3.
Figure 11:
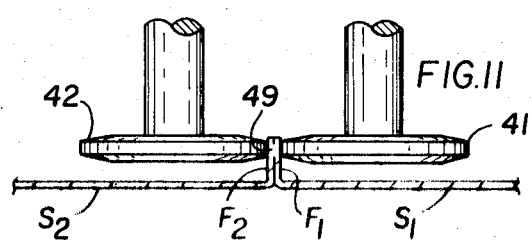
FIG. 11 is a cross-sectional, fragmentary, schematic view along lines XI—XI of FIG. 8, and illustrating the application of the welding electrodes to the flanges of the wrapping sheet.
Figure 12:
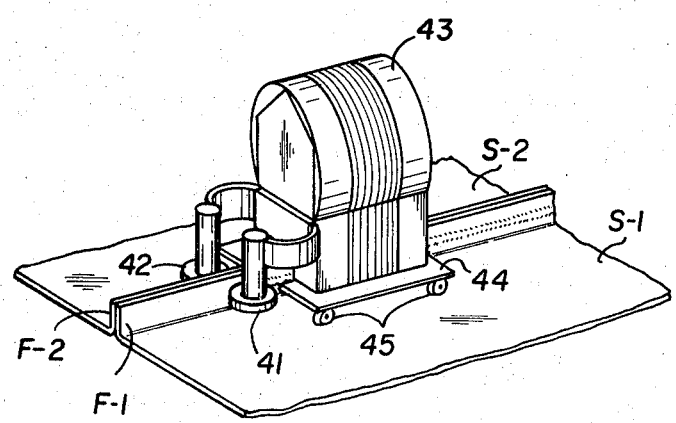
Figure 13:
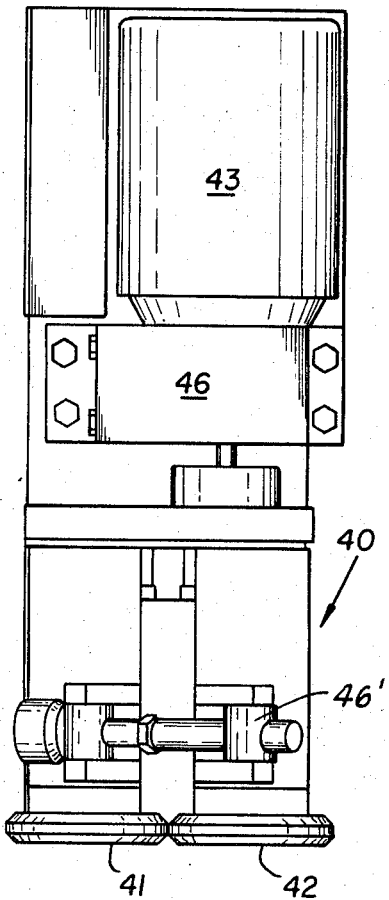
Figure 14:
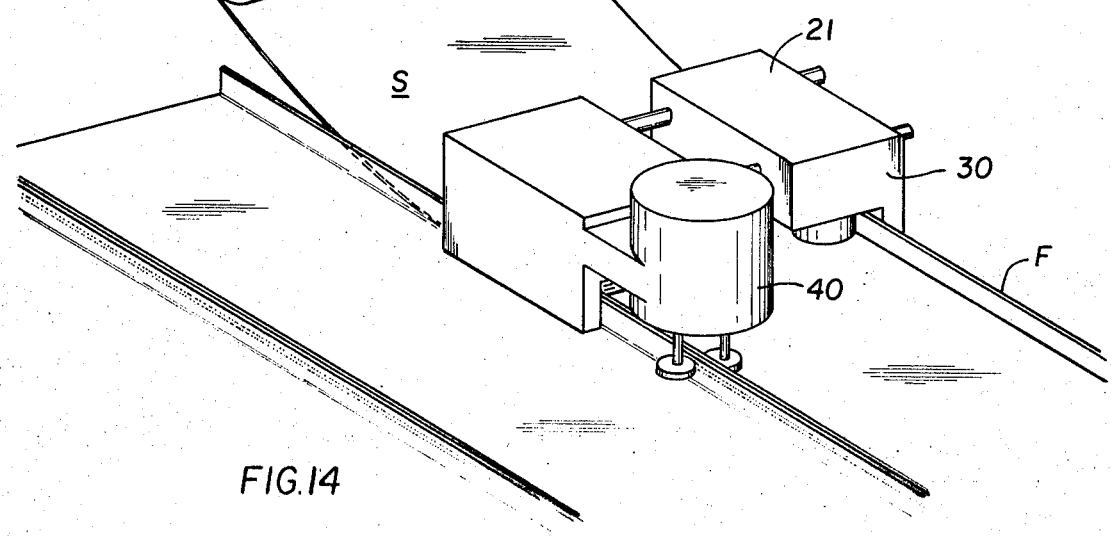
Figure 15:
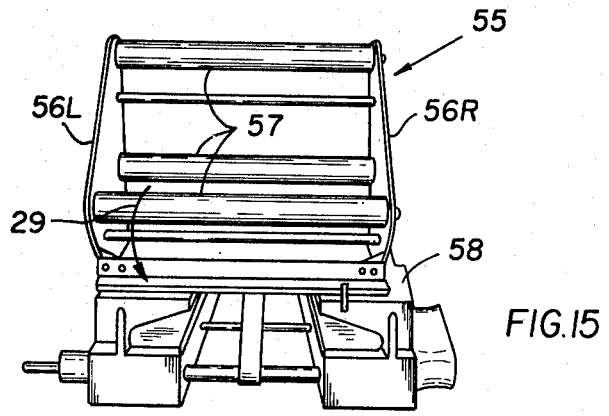
Figure 16:
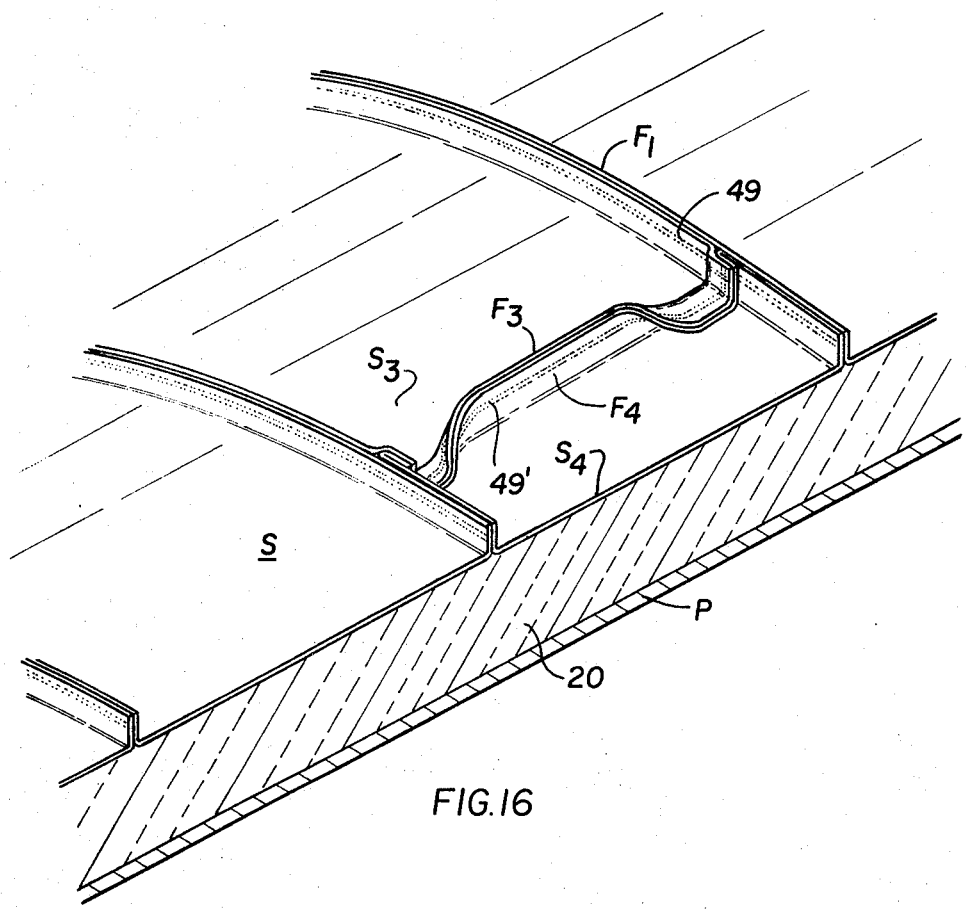

FIG. 12 is a perspective view of the welding apparatus and corresponds essentially to FIG. 5 of the aforementioned U.S. Pat. No. 3,264,446;

FIG. 13 is a side view of a different type of welding machine suitable for use in the present invention and corresponds essentially to FIG. 11 of the aforementioned U.S. Pat. No. 3,264,446;

FIG. 14 is a general perspective view of the welding apparatus, combined with a flange forming apparatus and illustrating the progression of a flat strip to a flange strip in which the strip is welded to an adjacent layer;

FIG. 15 is a general perspective view of a cage-type construction to hold a coil of stainless steel and;

FIG. 16 is a schematic illustration showing the longitudinal joining of two strips together, and a portion of the conduit and the insulation therefor in cross section.

DETAILED DESCRIPTION

An annular carrier cage 10 is mounted for longitudinal slidable displacement on rails, one of which is illustrated at 11 which, in turn, are mounted on a tracked vehicle 12. The rails are located on a support platform 13 which can be raised or lowered with respect to the vehicle 12 by a telescoping lift as schematically illustrated at 14. The pipe P is supported from the platform in a separable support block 15 which, internally, carries rollers and/or ball supports 16 to support the pipe, and to provide for longitudinal relative movement of block 15 with respect to the pipe P. The covered, wrapped pipe can be supported in suitable manner, for example, by being buried in a ditch, by being supported on pylons 17, or the like. The pipe P may be any suitable pipe, such as cast iron, steel, or other material and can be covered by an insulation material 20, of any desired and suitable material.

A stainless steel strip S is wrapped around the outside of insulation 20.

Figure 2:
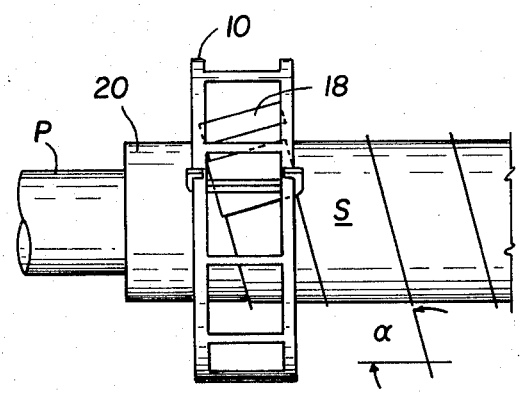
FIG. 2 is a top view of the apparatus of FIG. 1, in schematic form.
Figure 3:
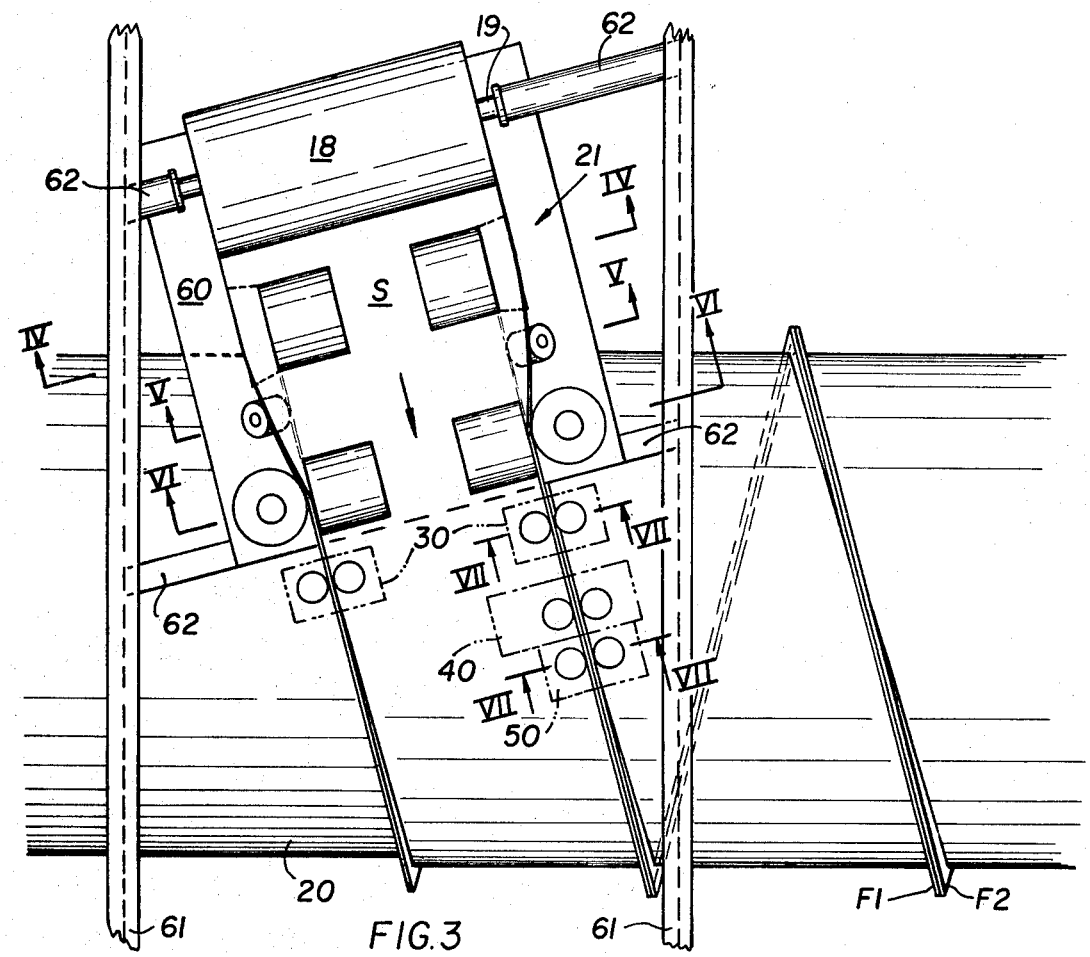
FIG. 3 is a developed top view, similar to FIG. 2, but flattened, in schematic form, and with the top covering shields removed.

The cage 10 acts as a carrier for assembly of cooperating separate elements and acts as a support for the supply coil of stainless steel strip S. The cage itself may be arranged to rotate about pipe P or, alternatively, may be formed in two parts, the outer one of which is longitudinally slidable on rails 11, and the inner part of which is rotatable about the pipe. If this construction is used, the inner part will carry the other parts of the apparatus. FIGS. 2 and 3 illustrate in general terms the arrangement of the portions of the apparatus located on a rotatable carriage 10. The interconnection of the carriage 10 with the rails will then be over bearings, permitting rotation of the annular carriage with respect to the rails, and not specifically shown and well known in the art. The general elements carried by the annular carriage are a coil 18 of strip material, held in a coil holder; a flange making apparatus 21, a flange extension apparatus 30, to curl the flange about its edges so that the flanged strip will bend around the circumference of the insulation and naturally form a curved, tightly fitting strip around insulation 20; a welding apparatus 40, to weld adjacent flanges together; and a stress relieving, or trueing apparatus 50. The stress relieving apparatus is not strictly necessary, but highly desirable to relieve stresses which arise due to the heat of welding, and to provide for a tight and exact fit of the welded seam about the circumference of the pipe, as the strip is placed thereover.

A coil of stainless steel strip, for example between ½ and 1 meter wide and 0.3 – 0.5 mm thick, and having a nominal length of about 50 meters or so is held on a shaft 19. Shaft 19, itself, can be directly secured to the annular carriage cage 10, if the cage is rotatable, or can, itself, be secured to a movable planet 60, forming a carrier for the various sub-assemblies 21, 30, 40 and 50. Carrier 10, if movable as a carrier cage which does not rotate about pipe P, but only longitudinally thereof, should then be formed with grooves 61 (FIG. 3), the planet platform 60 having extension arms 62 engaging, preferably over bearings, in the grooves 61, to be guided therein. Neither the length, nor the thickness, nor the width of the stainless steel strip is critical, and the total amount of steel strip which will be carried by the planet platform 60, or directly on the carrier cage 10, will depend on available space, available materials and the like. The direction of pull-off of the strip S from coil 18 will be at an angle with respect to the longitudinal extent of the pipe; this pitch angle $\alpha$ may be between 50°–70° but, again, may vary for different applications. The above-identified dimensions are suitable for ½–1 m outside diameter covered oil pipe, on which 1 m wide steel strip of about 0.3 mm thickness is being wound.

The steel strip coming from coil 18 is flat. The flanges are made as the steel is uncoiled, by apparatus generally indicated at 21, FIG. 3, and in greater detail in FIGS. 4 and 5.

Figure 6:
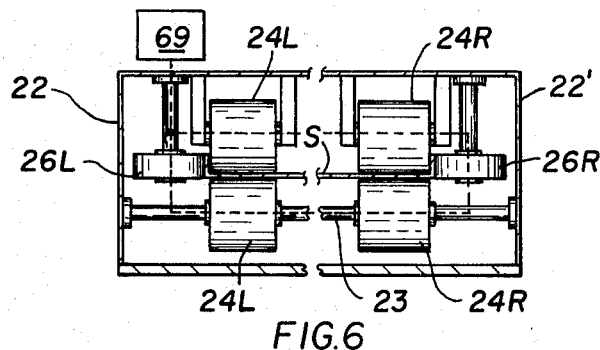
FIG. 6 is a cross-sectional view along lines VI—VI of FIG. 3.
Figure 7:
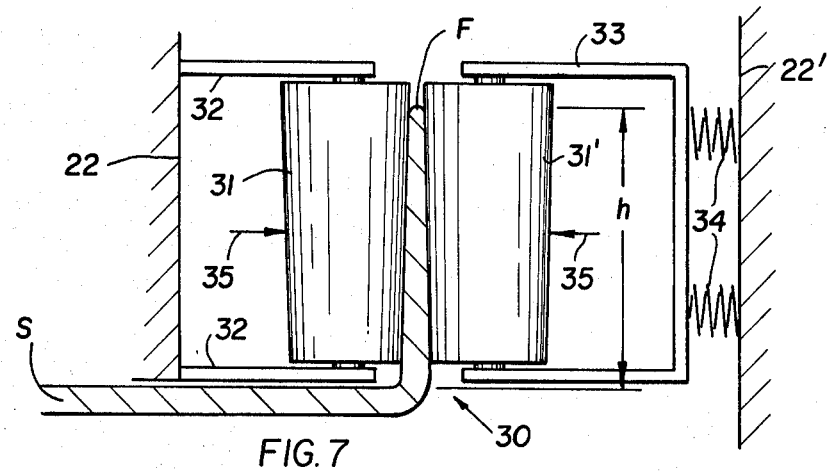
FIG. 7 is a schematic, fragmentary cross-sectional view along lines VII—VII of FIG. 3, and FIG. 7' a section along VII'—VII'.
Figure 7:
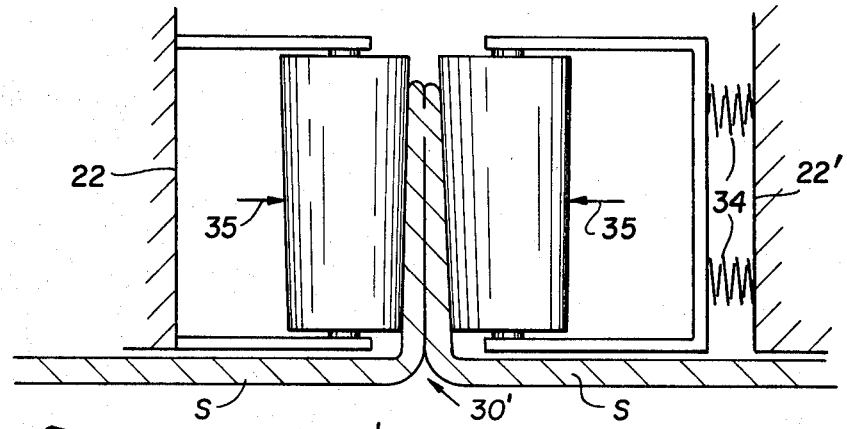

A pair of separable housing elements 22, 22', interconnected by slide rods 23 each carry a pair of support rollers 24L and 24R, extending generally along the median plane of the strip S, and set in from the edges of the strip. The housing portions 22, 22' further retain a pair of inclined rollers 25L, 25R, which bear against the edges of the strip to bend it upwardly; rollers illustrated in FIG. 4 have an angle of inclination with respect to the median plane of about 15° or so. The housing 22, 22', along its longitudinal extent, carries a further set of rollers similar to rollers 24L, 24R (not shown), and a pair of inclined rollers 27L, 27R (see FIG. 5) which have an angle of inclination with respect to the median plane of strip S of about 45°. Thus, the flange at the edges of the strip is formed gradually, the bend increasing as the strip passes through consecutive rollers. A further set of rollers 26L, 26R then forms a final 90° bend to the flange of the strip S (see FIG. 6). The height of the flange, that is, the dimension $h$ (FIG. 7) is, for a strip of about 1 mm wide, in the order of 1 cm. Thus, the flange itself does not detract substantially from the width of the strip as it is being wound on the pipe.

A strip which has a flange formed thereon will be flat. To permit curling of the strip about the round outer circumference of the insulation 20, the flange must be extended at the region closest to its free edge. This is done in the apparatus shown in FIG. 7 which, simultaneously, may provide the last, 90° bend pair of rollers of the flange forming apparatus. The flange extension apparatus 30 essentially comprises a pair of conical rollers 31, 31' which are suitably secured in the housing 22, 22' of the flange making apparatus. The inner roller 31 is fixed in the housing, as schematically indicated by bearing components 32; the outer conical roller 31' is held in a frame 33 which is pressed by a spring pressure as schematically indicated at 34 against a fixed housing portion of housing 22, 22'. Thus, compressive forces as schematically indicated by arrows 35 are exerted against the conical rollers which, due to their greater diameter towards the free end of flange F tend to reduce the outer side of the flange. As this material is reduced, it stretches and hence will cause curling of the strip S about a plane parallel to that of the drawing, FIG. 7, that is, curling of the flanged strip around the circumference of the insulation 20. The amount of pressure 35, 35 exerted by the conical rollers will depend on the amount of reduction in thickness of the flange, and thus extension of the flange in a transverse direction to provide for curling; to accomodate various materials, and flanges of different sizes, and to curl about pipes of different sizes, the specific location of the application of spring 34 between frame 32 and housing 22 can be made variable; alternatively, controllable pressure can be exerted, for example by a small hydraulic jack which, once loaded and adjusted for a specific pipe will maintain the pressure being exerted between the rollers 31, 31'. Other arrangements, rather than conical rollers may be used. For example, two cylindrical rollers can be used, set with axes inclined with respect to each other, or rollers against which the compressive force is applied nonuniformly throughout their axial extent. Incorporation of the flange extension rollers with the flange forming rollers, and using the flange extension rollers as the last forming rollers saves material and decreases the overall friction of the apparatus.

As the planet platform 60 rotates about the pipe, the thus formed flanged steel strip will be spiralled over the insulation 20. Transport of the planet platform 20, as well as connection of the flanges F of the strip being unwound with a preceding turn of the strip is made by a welding apparatus generally shown at 40, and described and disclosed in detail in the aforementioned U.S. Pat. No. 3,264,446. FIGS. 12 and 13 show two different embodiments of the welding apparatus, FIG. 12 showing a right-angle drive and FIG. 13 an in-line drive. Referring now to FIG. 12, a strip S–1 previously laid is to be connected with a newly uncurled strip S–2. The flanges F–1 are guided to be parallel to each other — as will appear in more detail below — squeezed together by a pair of roller electrodes 41, 42 which carry electrical welding current and, additionally, are rotatably driven by a motor 43, so that the rotation of the electrodes 41, 42 bearing against the flanges F–1, F–2 itself carries the welding apparatus 40 along the strips S–1, S–2. Welding apparatus 40 is secured to planet platform 60 and thus welding apparatus 40 not only welds the flanges F–1, F–2 together, but further provides rotary movement of the entire planet platform, in an orbital path within carrier cage 10.

Further drive of the planet platform may be necessary. The motor 43, and the electrodes, including the welding transformer are mounted on a base 44 which can be supported directly on the strip which has previously been laid and which is being newly laid, for example over rollers 45. The welding unit itself may be mounted on the planet platform 60 in such a manner that it can be readily removed, for example to weld ends of the strips together, as will appear below.

Rather than using the right-angle drive as illustrated in FIG. 12, an in-line arrangement of the welding apparatus can be used, as illustrated in FIG. 13. Again, a pair of roller electrodes 41, 42, mounted to bear against each other by a clamp 46' and as explained in detail in the aforementioned U.S. patent, are driven from a motor 43. The in-line drive arrangement, over a gear box 46 has the advantage that this type of apparatus can be easily removed for use of flange welding apart and separated from the annular carrier cage, or the apparatus as a whole. The operation is the same — the motor 43 driving electrodes 41, 42 which will roll along the flanges F-1, F-2 (not shown in FIG. 13) to press the flanges together and provide a tight uniform seam weld approximately centrally or upwardly thereof of the flanges F-1, F-2. It is desirable that not the entire extent of the flange is welded, but merely a strip, for example about ¼ to ⅓ the width of the flange. This will permit the flange to slightly bend out of a pure 90° position, that is, it will permit slight lateral flexion, to accomodate temperature differences between the welded covering, the pipe, and the insulation; and to allow for slight misalignments. Before the flanges F-1, F-2 can be welded together, they should be accurately aligned both laterally, as well as with respect to the height h of the flanges. The alignment of the flanges with respect to the height $h$ can be accomplished by suitably adjusting the position of the flange forming rollers, and particularly of the extension rollers 31, 31'. To provide for lateral, that is, side-by-side alignment, the apparatus shown in connection with FIGS. 8 to 11 is suitable.

Figure 8:
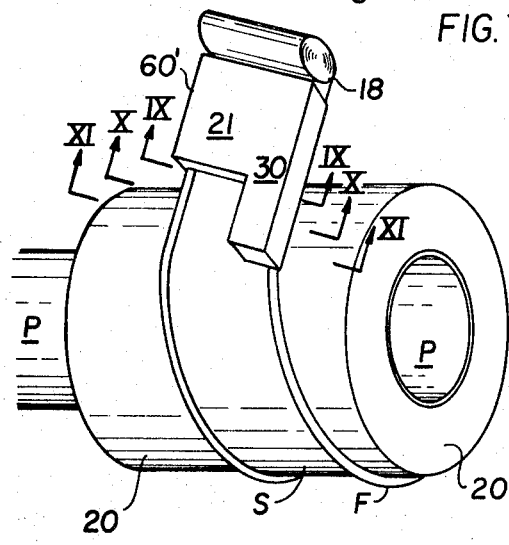
FIG. 8 is a perspective schematic view illustrating the guiding portion, which can be incorporated in the apparatus.
Figure 9:
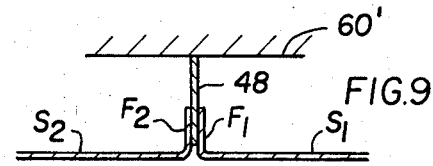
FIG. 9 is a transverse, schematic, fragmentary, cross-sectional view along lines IX—IX of FIG. 8.
Figure 10:
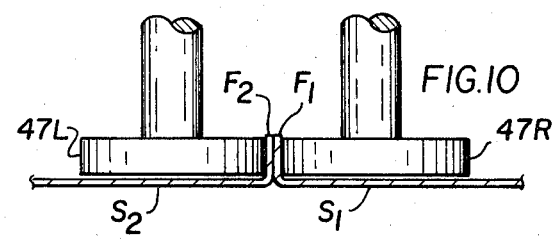
FIG. 10 is a fragmentary, cross-sectional view along lines X—X of FIG. 8.

The planet platform 60', FIG. 8, is shown schematically, in a somewhat different constructional form from that of FIG. 3. As part of the flange forming apparatus, or of the extension apparatus, or already as part of the welding apparatus, a pair of guide rollers 47R, 47L (FIG. 10) are provided, located at the section line X—X of FIG. 8. In advance of guide rollers 47R, 47L, a guide plate 48 (FIG. 9) is provided, bearing laterally against flange F-1, slightly separating the flanges and guiding rollers 47R 47L to bear against the flanges F-1, F-2. Plate 48 is secured to the overall housing of the assembly, shown schematically connected to the planet platform 60'. Trailing the rollers 47R, 47L (FIG. 10), the roller electrodes 41, 42 are then located at section XI—XI of FIG. 8 to make the seam weld at the location 49 (FIG. 11). As can be noted, the seam weld is not immediately adjacent the bend of the flange F from the band S, but rather somewhat up the flange, to provide for lateral resiliency of the interconnection. Yet, although a resilient interconnection is provided between adjacent bands, the connection is absolutely fluid-tight, and thus the covering is capable of resisting not only mechanical transfer, but attack by plants, inserts, bacteria, and fluids of any kind, to completely separate the interior of the wound stainless steel covering from the exterior thereof. The guide rollers 47R 47L physically may be incorporated as part of the welding apparatus or may form part of the flange forming or flange extension apparatus and may be suitably secured to a suitable housing section or support travelling with the planet platform. If desired, a pair of sliding springs may be located between the guide plate 48 and the rollers 47R 47L, to further assist in bringing the flanges F-1, F-2 closely together.

After the flanges F-1, F-2 are welded together by the electrodes 41, 42, it has been found that the flange may shrink due to the welding operation. Thus, forces may arise within the wall of the joints tending to straighten out the band, that is, tending to counteract the curl imparted to the band, and the flanges by the flange extension apparatus. To counteract this curling effect, to the extent that it may arise, a stress relieving or post-extension apparatus similar to the apparatus disclosed in connection with FIG. 7' is preferably employed. Such apparatus is schematically indicated at 50, FIG. 3, and in actual construction can be identical to the flange extension apparatus discussed and described in connection with FIG. 7. For simplicity of manufacture, it may be desirable to make the flange extension apparatus and the post-welding stress relieving or trueing devices similar.

The various elements of the planet are all mounted on the planet platform 60, or 60', respectively. The planet platform can, itself, be driven by the motor 43 for the welding apparatus; for large assemblies, or when the driving force of the motor may be insufficient to pull the entire assembly through the flange making apparatus, which introduces additional friction, a further drive may be desirable. Thus, the planet platform P can be mounted on an internal gear ring 64, shown in a fragmentary view in FIG. 1, which is engaged by a motor 65, riding on the rails 11. Drive of the motor 65 with drive of the electrode rollers 41, 42 should preferably be synchronized, although some slippage between the electrodes and the flanges can be tolerated. Longitudinal feed of the cage 10 can be obtained directly by the engagement of the flange making apparatus and the electrode rollers, as well as the extension or trueing rollers of elements 30, 50 of the apparatus with the spirally wound flanges or, additionally, the cage 10 can be power-driven by a standard feed screw arrangement, for example by a motor 66 secured to platform 13, having a screw spindle 67 connected thereto, which engages a follower block 68, mounted on the annular cage 10 to effect longitudinal movement of the cage along the length of pipe P. Other, equivalent drives can be used, for example a motor secured to the annular cage 10, having a gear which engages with a rack mounted on platform 13, chain transmissions or the like.

The length of the coils 18 carried by the cage 10 is determined largely by the overall structure, and by the size of the apparatus, and by the relative size of the winding apparatus with respect to the diameter of the insulated pipe which is to be covered. The usual, commercial length, in the order of 50 meters, more or less, can readily be accomodated on an ordinary cage construction. To join the ends of the flanges together, a flanged joint as shown in FIG. 16 can be made. Such flanged joints can be similar to joints made on flat, plain sheets, since the curvature of the strip around the conduit will be small enough so that it can be neglected. If a strip S3 (FIG. 16) runs out, an end flange F3 is formed thereon. The next adjacent strip is loaded on the apparatus, and an end flange is formed thereon, for example manually, or by running the end through an otherwise externally located flange making arrangement, similar to that described in connection with FIGS. 3–5. Both the last strip S3, as well as the new strip S4 will thus have flanges F3, F4 formed thereon. The seam welding apparatus 40 can then be removed from the platform (if removably secured) and guided by hand across the formed flanges to make a seam 49' across the transverse flanges F-3, F-4. The lateral flanges F-1 are then formed, which will cause the now joined flanges F-3, F-4 to be bent over, as seen at 49''. The ends of the sheet can thus be joined together so that, both mechanically as well as electrically, the wrapped strip will form one integral unitary element. The weld 49' again should preferably not be made intermediate the length of the flange F-3, F-4, to provide some resiliency longitudinally of the strip, to accomodate slight mis-alignments and expansions or contractions of the strip with respect to the pipe on which it is placed, so that the advantages of a completely tight covering are obtained without, however, setting up excessive stresses in the covering itself which may, eventually, cause damage.

The apparatus of the present invention can be used, for example, in connection with oil pipe lines or other insulated conduits. The heat release in connection with the seam welding does not penetrate to the flat portion of the strip S to such an extent that it presents a problem with respect to organic insulation. Tests have been done in which the strip is laid on flat wooden slats, and the welding heat does not, in any way, adversely affect the wood beneath the stainless steel strip S.

FIG. 15 shows an installation of a seam welding apparatus, combined with a flange forming apparatus removed from the cage, and in which the various elements and parts can readily be seen. The flange forming apparatus there used is of the type illustrated generally in FIG. 12. The stainless steel strip can be held on the cage either by the shaft 19, secured to the cage, or by the independent roller-transport cage 55, seen in greater detail in FIG. 15. Cage 55, essentially, has a pair of side plates 56L, 56R, interconnected by transverse rollers 57, in which a coil 18 of strip can be placed. A similar assembly of side plates 56L, 56R and rollers 57 is then placed over the coil, and the two assemblies are locked together, for example by snap fasteners, bolts or the like. Thus, the coil cannot escape even when it is upside down, and is positively guided, while easily unrolling. The entire assembly of side plates, and rollers is mounted on a platform 58 which, in turn, is secured to the planet platform 60, or 60' respectively. The coil in this instance can be unwound to wrap around one of the rollers 57, and pass underneath the platform to be flanged in flange forming apparatus mounted beneath the coil mount itself, as indicated by arrow 29, FIG. 15. A welding apparatus 40, of the type illustrated in FIG. 13 can be mounted on the same platform. The upper part of the cage 55 has been omitted from the drawing for clarity; its construction to hold a coil, in space, will be obvious. The flange holder 55, together with the flange forming apparatus on platforms 58 and 60, 60' will be mounted to be inclined with respect to the axis of the pipe, as illustrated in FIG. 3.

Electric power for welding, as well as for driving the motors is transmitted by means of collector shoes or brushes, mounted on the annular cage 10, and bearing against a pair of annular current supplying rings, insulated against the outside. Both the brushes, as well as these rings have been omitted from the drawing for simplicity, a sliding current transfer arrangement being well known.

Figure 1:
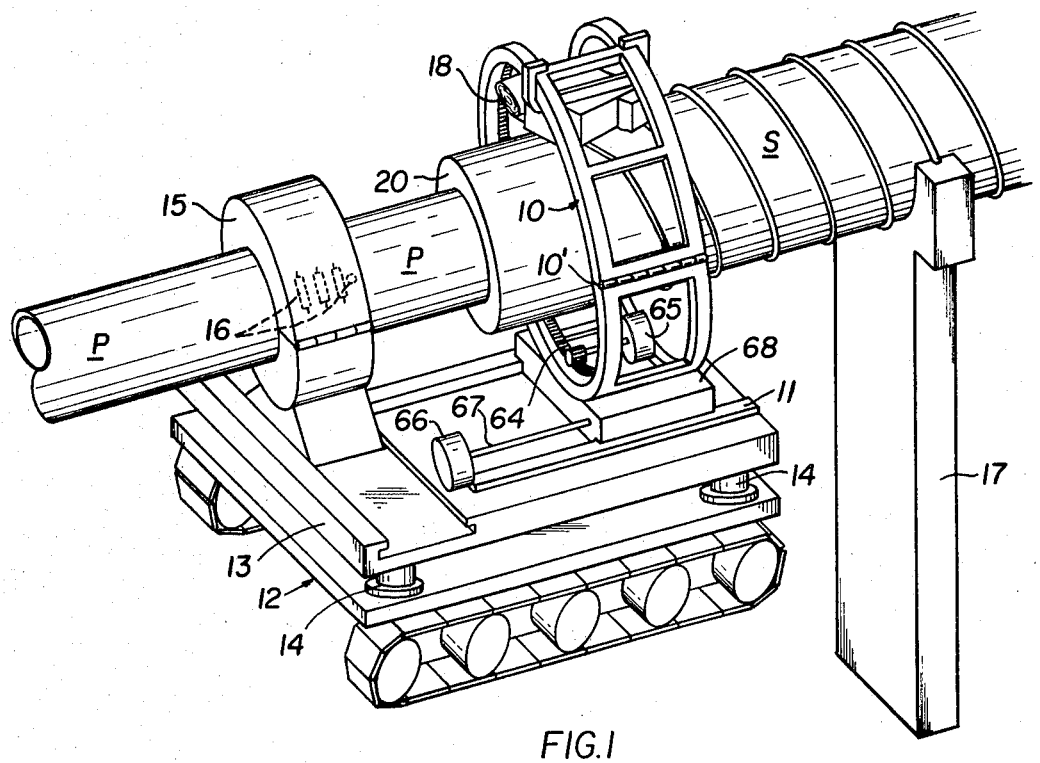
FIG. 1 is a general, perspective view of the pipe covering apparatus mounted on a caterpillar-track support vehicle, and illustrated to apply a stainless steel welded covering strip on insulated oil pipe lines.

Insulation of the pipe, and wrapping of the insulation with the stainless steel coil can be done in continuous operations. Referring to FIG. 1, clamp 15 is opened and the pipe clamped therein. The trailing end of the pipe is supported, for example by a chain hoist, by pylon 17, or on the ground, or as desired. A section of insulation 20, usually in the form of semi-circular sections is then placed about the pipe and preliminarily secured so that the halves of the insulation will not separate and fall off. Thereafter, the wrapping device is started, and the end of the spiral covering secured. As soon as the first turn has been placed, adjacent flanges will weld together, forming a completely tight spiral welded covering. As the welding proceeds, further insulation sections are placed around the pipe until the insulation and annular cage have reached almost the position of clamp 15. At that point, clamp 15 is opened, the longitudinal feed, for example by block 68, released and the entire apparatus can be moved forward on the tracked vehicle 12, which will again place annular cage 18 at the far right of vehicle 12. The pipe is then again clamped in clamp 15, further insulation sections can be placed around and wrapping, flange forming and welding can proceed as before. After the initial insulation section has been placed, further insulation sections can be secured very simply, since portions of the insulations may be inserted into a projecting spiral opening, the insulation itself being securely held by the wound spiral sheet S. Thus, heretofore necessary steps of tightly and mechanically strongly securing the insulation sections together can be eliminated. If the pipe itself is sufficiently stable and rigid, the clamp 15 need not completely hold pipe P in place, but can be left loose, and vehicle 12 itself be moved forward as the wrapping proceeds, motor 66 and spindle 67 being disengaged, and the annular cage 10 travelling forward as determined by the pitch of the spiral being wound on the pipe P. This arrangement also decreases the size of the vehicle 12 being required, because otherwise the length of the vehicle 12 must be at least as long as the insulation sections so that, when the annular cage 10 is at its extreme right-hand position (FIG. 1), there is sufficient space between the clamp 15 and the end of the previously placed insulation, to insert new sections of insulation around the pipe.

The present invention has been illustrated and described with the installation of elevated pipes. Of course, various changes and modifications may be made with the inventive concept; for example, the pipe can be installed on the ground, the vehicle 12 being merely a movable platform; the conduit, with its insulation, can be pre-assembled, the spiral wrapping being placed in a continuous operation. The slight resiliency given to the wrapping by the flanges, which are welded at an intermediate point along the height of the flanges permits slight bending of the pipe and ready lowering of wrapped, insulated pipe into the ground, for example behind pilot 17, if placement in a ditch is desired.

Both the annular cage 10, as well as clamp 15, and all other apparatus arranged to surround pipe P and the insulation 20, respectively, should be made in sectional form, so that they can be opened or removed in part for placement about the pipe. Thus, cage 10 is sectionalized by hinges or clamp joints 10' in a group of sub-elements, for ready placement around a pipe, and insulation 20, respectively, for disassembly, and easy access to the flange welding apparatus 40, separately, if it is desired to use the same apparatus to make transverse welds to join strips together longitudinally, as discussed in connection with FIG. 16.

FIG. 14 illustrates, to a different scale, the flange forming apparatus with an individual motor drive 69. For certain installations it may be desirable to provide a power drive for at least some of the rollers 24L, 24R, 25L, 25R, 26L, 26R or 27L, 27R, or additionally, for the right-angle and support rollers shown in FIG. 6, or the tapered rollers 31, 31' of the flange extension apparatus. The power requirements, and the requirements for separate drives can be determined by the strength of the steel strip 18, and its resistance to deformation during the bending step.

We claim:

1. Pipe covering apparatus to spirally wind a metal cover band (S) around a pipe (P, 20) comprising
    an annular cage (10) adapted to be placed around a pipe;
    a carrier (60, 60') located on said cage and mounted to rotate with respect to the pipe while travelling lengthwise thereof;
    a metal strip coil support means (19, 55) secured to said cage (10), for holding a coil (18) of strip metal thereon and permit unwinding of said strip from said coil and spiral winding of said strip on the pipe;
    flange forming means (21) secured to said cage, for shaping said strip and forming, along its edges, a pair of angled flanges (F);
    flange extension forming means (30) secured to said cage and operating conjointly with said flange forming means (21) to provide reduction in thickness of the material of the flange (F) towards its outer edges, to curl the flanges and permit winding of the flanged strip about said pipe;
    seam welding means (40) located at the trailing side of said apparatus and welding the flange of the strip being uncoiled to an adjacent flange of strip uncoiled at a prior revolution of said coil about said pipe;
    means (11, 12, 13) supporting said cage (10) with respect to said pipe;
    and means (43, 65) effecting rotation of said cage about said pipe while permitting longitudinal travel of said cage lengthwise, with respect to said pipe.

2. Apparatus according to claim 1, wherein said seam welding means (40) comprises
    a pair of rotatable electrodes (41, 42) engaging, each, respective flanges (F1, F2) of the coil being unwound and the strip unwound during a preceding rotation thereof about said pipe.

3. Apparatus according to claim 2, wherein said seam welding means (40) further comprises motor means (43) secured to said cage and driving the electrodes to effect rotation of said cage about said pipe (P) by engagement of said rotatable electrodes with the flanges of the strip.

4. Apparatus according to claim 1, including a stress relieving means (50) secured to said cage (10) and located to engage the flanges (F) behind the seam welding means, with respect to the travel of the cage, said stress relieving means (50) comprising
    means (31, 31') bearing against the welded flanges and exerting compressive forces thereagainst to relieve stresses arising due to the heat of welding of the flanges and to avoid, or compensate for, distortion of the flanges (F), and hence the strips (S), due to welding.

5. Apparatus according to claim 4, wherein said stress relieving means (50) comprises
    a pair of rollers (31, 31'), one roller each bearing against a respective flange (F1, F2);
    and means (34, 35) pressing said rollers (31, 31') towards each other.

6. Apparatus according to claim 1, wherein the flange extension forming means (30) comprises
    a pair of rollers (31, 31'), one roller each bearing against opposite sides of the flange (F) formed in the flange forming means;
    and means (34, 35) pressing said rollers towards each other (31, 31') while exerting higher pressure at the free edges of the flanges than at the roots of the flanges to provide a greater reduction in material thickness at the outer edge, and, hence, curling of the flange about its edges.

7. Apparatus according to claim 6, wherein said rollers are conical (FIG. 7: 31, 31') with the greater diameter of the conical region being adjacent the outer edges of the flange (F).

8. Apparatus according to claim 6, wherein said stress relieving means (50) comprises a pair of rollers (31, 31'), one each bearing against the respective flange (F1, F2);
    and means (34, 35) pressing said rollers towards each other, said stress relieving means (50) and said flange extension forming means (30) being substantially similar.

9. Apparatus according to claim 1, wherein said metal strip coil support means comprises
    a shaft to hold the coil of strip metal thereon and having its axis inclined with respect to the axis of said annular cage to provide for spiral unwinding of the coil.

10. Apparatus according to claim 1, wherein said metal strip coil support means comprises
    a plurality of essentially parallel rods arranged to form a coil holding cage and adapted to surround a coil of strip metal and hold said coil within the coil holding cage formed by said rods; said rods having their axes inclined with respect to the axis of said annular cage to provide for spiral unwinding of the strip from the coil.

11. Apparatus according to claim 1, wherein said flange forming means comprises a plurality of pairs of guide means located adjacent the edges of the strip, one pair of guide means supporting the strip in the major plane of its width and another pair of guide means being located adjacent the edge of the strip and inclined with respect to said major plane to bend said strip and form a bent flange.

12. Apparatus according to claim 11, wherein said guide means are rollers and a plurality of inclined rollers are provided, located one behind the other, the angle of inclination for successive rollers increasing towards 90°.

13. Apparatus according to claim 12, wherein at least the last pair of rollers, with respect to the unwinding direction of the metal strip, are conical with the greater diameter of the conical region bearing against the outer edges of the flange to provide for reduction of metal thickness of the outer edges, while forming the last bend to essentially 90° of the flange, and permit curling of the flange about its edge, said last pair of rollers forming said flange extension apparatus.

14. Apparatus according to claim 1, wherein said annular cage is formed in at least two separable parts to permit lacing said apparatus about a pipe.

15. Apparatus according to claim 1, wherein the means supporting the cage with respect to the pipe comprises
   a support structure adapted to be placed about the pipe;
   rails extending parallel to the pipe;
   and means mounted on said rails supporting said carrier cage for rotation about said pipe while permitting longitudinal travel along said rails.

16. Apparatus according to claim 15, wherein said support structure includes a tracked vehicle.

17. Apparatus according to claim 1, including a guide plate (48) secured to said cage (10) in advance of said seam welding means (40), said guide plate extending toward and engaging a flange (F) of the strip to guide the welding means with respect to the flange.

18. Apparatus according to claim 17, wherein the guide plate (48) is located to extend between adjacent flanges (FIG. 9: F1, F2) of adjacent strips, and means (47R) are provided to press the flanges together and guide them aligned and adjacent each other to the seam welding means (40).

19. Apparatus according to claim 1, wherein the carrier is an annular cage concentric with said cage.

20. Apparatus according to claim 1, wherein the carrier (60, 60') is a platform movably mounted on said cage (10).

21. Pipe covering apparatus according to claim 1, in combination with a coiled strip of stainless steel.

* * * * *